Nov. 11, 1924. 1,515,394

H. W. KERR

WIRE ROPE END COUPLING OR SOCKET

Filed June 20, 1924

INVENTOR.
Herbert W. Kerr,
BY
ATTORNEY.

Patented Nov. 11, 1924.

1,515,394

UNITED STATES PATENT OFFICE.

HERBERT W. KERR, OF AUGUSTA, KANSAS.

WIRE-ROPE-END COUPLING OR SOCKET.

Application filed June 20, 1924. Serial No. 721,297.

*To all whom it may concern:*

Be it known that I, HERBERT W. KERR, a citizen of the United States, residing at Augusta, in the county of Butler and State of Kansas, have invented certain new and useful Improvements in Wire-Rope-End Couplings or Sockets, of which the following is a specification.

This invention relates to wire rope end couplings or sockets and has for its primary object the provision, in a manner as hereinafter set forth, of a wire rope end coupling or socket of such construction that the rope end may be securely and permanently fixed therein without the use of bolts or clamps, or other removable securing means.

A further object of this invention is the provision, in a manner as hereinafter set forth, of a wire rope end coupling or socket of such construction as to pass smoothly through the groove of a pulley wheel over which the wire rope might run, without undue wear and tear upon the coupling.

A still further object of this invention is the provision, in a manner as hereinafter set forth, of a wire rope end coupling or socket of uniform external diameter throughout, and having the central portion thereof so formed that a molten metal seal may be poured therein about the rope end when the same is in position, to prevent the removal of the same from the socket after the metal has solidified.

A final object of this invention is the provision, in a manner as hereinafter set forth, of a wire rope end coupling or socket of simple construction, strong and sturdy, of neat appearance and inexpensive to manufacture.

The invention will be best understood from a consideration of the following detailed description taken in connection with the accompanying drawings forming part of this specification, with the understanding that the invention is not confined to any strict conformity with the showing of the drawings, but may be changed and modified so long as such changes and modifications mark no material departure from the salient features of the invention as expressed in the appended claims.

In the drawings.

Referring now to the drawings in detail wherein like numerals of reference indicate corresponding parts throughout the several views, the terminal ends of a wire rope or cable are indicated at 1, and each end carries thereon one of the devices embodying this invention.

Figure 1:
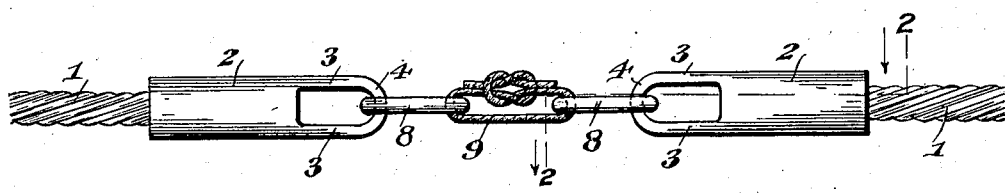
Figure 1 is a side elevation of a pair of the couplings or sockets embodying this invention shown as connecting a rope end.
Figure 2:
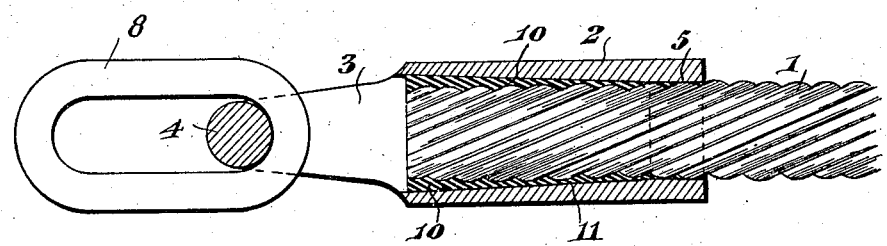
Figure 2 is an enlarged detail sectional view taken upon the line 2—2 of Figure 1.

The invention comprises a body member 2 formed, preferably, of steel, and as shown, this body is cylindrical and of constant diameter throughout its length. Extending from one end of the body 2 at diametrically opposite points are the arms 3 merging at their outer ends and connected by the loop or yoke 4, thus forming an integral link at one end of the body 2. As shown in Figure 2, the arm 3 is of greater width at its base or the point of joinder with the end of the body 2 than at the point of mergence with the yoke 4, the sides gradually converging outwardly toward the yoke and changing from a broad flat member into the circular yoke 4.

Figure 3:
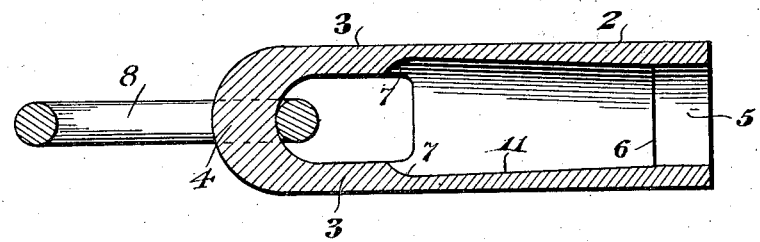
Figure 3 is an enlarged longitudinal sectional view of the socket taken at right angles to the plane of the section shown in Figure 2.

The body 2, as will be seen upon reference to Figure 3 of the drawings, is of tubular construction, the inner wall at that end of the body remote from the link end, being parallel with the outer wall of the body for a substantial distance inward as at 5 to the point 6. From this point 6, the inner wall of the body gradually diverges toward the link carrying end of the body as shown in Figure 3, thus gradually increasing in diameter from the point 6 to the point 7.

A loop or link 8 is permanently closed about the link carried at the end of the body member 2 as is shown, and these links 8 are secured together by any appropriate securing means such as a rope or cable 9, to draw the ends of the cable 1 together when the members are secured thereto.

The portion 5 of the bore of the body 2 is of sufficient diameter to snugly receive therethrough the end of the wire cable and when the cable is extended into the bore, until the end thereof is approximately in line with the point 7, a molten metal such as lead or Babbitt metal, indicated at 10, is poured in through the link end of the body to fill the space between the side of the rope end 1 and the side wall 11 of the bore of the body. Thus when this Babbitt metal or lead solidifies, it will hold the end of the wire rope 1 securely wedged in position and all effort to withdraw the same from the body will be futile because the more stress or strain that is put upon the rope and the link of the body, the tighter the metal will wedge between the rope end and the wall 11 and thus the tighter will the rope end be held.

While this rope end socket or connection is intended primarily for use upon bull wheel ropes, it is to be understood that the same is not limited to such use but may be used wherever applicable and wherever it is desired to engage two ends of a power pulley rope in such a manner that the connected ends will pass easily over the pulley wheel without danger of throwing the rope off or doing damage to the flanges of the wheel.

Having thus described my invention what I claim is:

1. A rope end connection comprising, a cylindrical body having an axial passage therethrough for the reception of a rope end, said passage, from one end for a slight distance inwardly, being of uniform diameter and then gradually increasing in diameter to a point adjacent the other end to receive, after the insertion of said rope end, a molten securing metal, and a link formed integral with that end of the body where the passage is of greatest diameter.

2. A rope end connection comprising, a cylindrical body having an axial passage therethrough for the reception of a rope end, said passage, from one end for a slight distance inwardly, being of uniform diameter and then gradually increasing in diameter to a point adjacent the other end to receive, after the insertion of said rope end, a molten securing metal, and a link formed integral with that end of the body where the passage is of greatest diameter, said portion of uniform diameter, of the said passage, being of a size to snugly engage the rope end passing therethrough.

3. A rope end connection comprising, a cylindrical body having an axial passage therethrough for the reception of a rope end, said passage, from one end for a slight distance inwardly, being of uniform diameter and then gradually increasing in diameter to a point adjacent the other end to receive, after the insertion of said rope end, a molten securing metal, and a link formed integral with that end of the body where the passage is of greatest diameter, said body being of constant external diameter throughout, the outer sides of said integral link being parallel with the outer face of the body.

In testimony whereof, I affix my signature hereto.

HERBERT W. KERR.